United States Patent [19]

Maringer

[11] 4,045,687
[45] Aug. 30, 1977

[54] CIRCUIT ARRANGEMENT FOR EVALUATING THE ELECTRICAL OUTPUT SIGNALS OF A DETECTOR FOR THICKNESS CHANGES IN A FUEL INJECTION LINE

[75] Inventor: Albert Maringer, Karlsruhe, Germany

[73] Assignee: Siemens Aktiengesellschaft, Munich, Germany

[21] Appl. No.: 716,220

[22] Filed: Aug. 20, 1976

[30] Foreign Application Priority Data

Sept. 3, 1975 Germany ............................ 2539194

[51] Int. Cl.² ............................................. H03K 5/20
[52] U.S. Cl. .................................... 307/358; 307/290; 328/149
[58] Field of Search ........................... 307/235 J, 290; 328/146, 147, 149

[56] References Cited

U.S. PATENT DOCUMENTS

| | | | |
|---|---|---|---|
| 2,952,811 | 9/1960 | Carr | 328/149 |
| 3,800,164 | 3/1974 | Miller | 328/147 X |
| 3,968,447 | 7/1976 | Baylac et al. | 307/235 J |
| 4,004,239 | 1/1977 | Clarke | 307/235 J |

*Primary Examiner*—John S. Heyman
*Attorney, Agent, or Firm*—Kenyon & Kenyon, Reilly, Carr & Chapin

[57] ABSTRACT

A circuit arrangement for evaluating the electrical output signals of a detector for thickness changes in a fuel injection line under the influence of an injection process comprising a series circuit connected to output terminals of the detector and including a differential amplifier, an a-c voltage amplifier, a highpass filter and a rectifier with a peak value storage device and a Schmitt trigger each connected in parallel to the output of the rectifier, the output of the peak value storage device being connected as a reference input of the Schmitt trigger, and a one shot multivibrator connected to the output of the Schmitt trigger.

4 Claims, 1 Drawing Figure

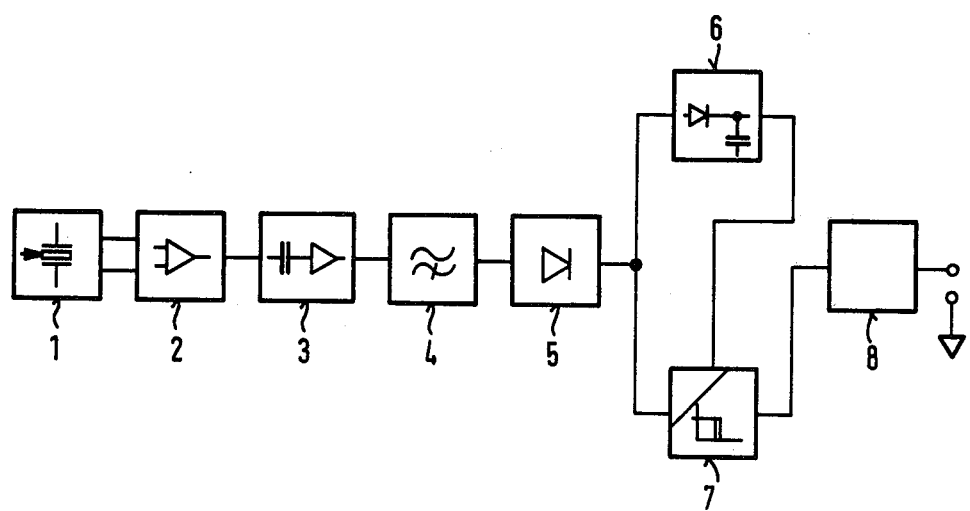

4,045,687

CIRCUIT ARRANGEMENT FOR EVALUATING THE ELECTRICAL OUTPUT SIGNALS OF A DETECTOR FOR THICKNESS CHANGES IN A FUEL INJECTION LINE

BACKGROUND OF THE INVENTION

This invention relates to a circuit arrangement for evaluating the electrical output signals of a detector for thickness changes in a fuel injection line under the influence of an injection process in general, and more particularly to such a circuit for evaluating the rapid pressure variations generated when an injection valve is closed.

An injection time detector for internal combustion engines having fuel injection which comprises a transducer attached to the outside of the fuel injection line for picking up the elastic changes of the outside diameter of the line caused by the injection process and converting them into an electrical signal is disclosed in copending application Ser. No. 715,850. The injection process lasts a certain time. It is therefore important to select from the electrical signal representing the entire injection process a part which always appears, within the overall process, at the same point in the injection process, regardless of the duration of the injection. One possibility for this purpose is the beginning of the injection process. The relatively flat slope of the injection pressure at the beginning of the injection process is, however, disadvantageous and makes such a choice questionable. A further problem in measuring is that, even if the detector is attached only to the injection line of one cylinder, signals above the general noise level from the injection lines of the other cylinders are also transmitted to the detector, even if attenuated.

Investigations of the entire injection process have shown that a pressure waveform similar to a water shock ("hammer") caused by the rapid closing of the injection valves, occurs in the fuel. This waveform is also transmitted to the walls of the fuel injection line. The waveform is a sequence of relatively high frequency (>500 Hz) pressure waves with, first, a high and then rapidly decreasing amplitude.

SUMMARY OF THE INVENTION

It is an object of the present invention to evaluate an electrical signal that corresponds to the pressure waves at the end of the injection process described above.

Another object is to discriminate the signal of one cylinder from the signals of the other cylinders.

According to the invention, these objects are achieved by connecting an a-c voltage amplifier, a highpass filter and a rectifier in series, with a peak value storage device and a Schmitt trigger connected in parallel and each connected to the output of the rectifier, the output of the peak value storage device being connected as a reference input to the Schmitt trigger and a one shot multivibrator being connected to the output of the Schmitt trigger.

The a-c voltage amplifier amplifies the pressure waves caused by the closing of the injection valve in the fuel column, i.e., the electrical output signal of the detector representing these pressure waves. In the highpass filter, which has a cut off frequency of about 500 Hz, the characteristic vibrations are filtered out and the output signal of the highpass filter is finally rectified in rectifiers for further homogenizing the signal. This signal is fed on the one hand to the peak value storage device and, on the other hand, to a Schmitt trigger, the reference input of which is connected to the output of the peak value storage device. This arrangement prevents triggering by interference waves from other injection lines of the engine below an adjustable reference level. The one shot is triggered by the output of the Schmitt trigger and delivers an output signal which exactly marks the end of the injection process.

If the detector having its output signal evaluated is a piezoelectric detector, it must also be possible to measure the base voltage which is caused by the clamping force of the piezoelectric element. For this purpose the a-c voltage amplifier is preceded by a differential amplifier, at the output of which this base voltage can be measured. Prior to each measurement, the clamping force of the piezoelectric element should be set so that there is a uniform base voltage. The lower cut off frequency of the highpass filter is advantageously chosen at approximately 500 Hz.

BRIEF DESCRIPTION OF THE DRAWINGS

The single FIGURE is a block diagram of the circuit arrangement of the present invention.

DETAILED DESCRIPTION OF THE INVENTION

As illustrated, the output leads of a piezoelectric detector 1 are connected to the two inputs of a differential amplifier 2. By means of an instrument, not shown for the sake of simplicity, the base voltage of the piezo detector can be measured at the output of the differential amplifier 2 for adjusting the clamping force of the piezoelectric element. The output of the differential amplifier 2 is connected to the input of an a-c voltage amplifier 3, which further amplifies only the a-c component of the output voltage of the differential amplifier. The output of the a-c voltage amplifier 3 is connected to the input of a highpass filter 4, which passes all frequencies of the a-c voltage signal above about 500 Hz and heavily attenuates the portion of the signal below this frequency. The output of the highpass filter 4 is fed to the input of a rectifier 5, which rectifies the amplified waves to homogenize the signal further. The output of the rectifier 5 is connected on the one hand to the input of a peak value storage device 6 and, on the other hand, to the input of a Schmitt trigger 7. The output of the peak value storage device 6 is connected to a reference input of the Schmitt trigger 7. It is ensured in this manner that the Schmitt trigger 7 can respond only if its input voltage corresponds to a reference level which is a preset ratio derived from the same signal. The output of the Schmitt trigger is connected to the input of a one shot multivibrator, at the output of which a signal exactly marking the end of the injection process can be taken off.

What is claimed is:
1. Apparatus for evaluating the electrical output signals of a detector for thickness changes in a fuel injection line due to the influence of the injection process, such as the rapid pressure variations generated when an injection valve is closed, comprising:
   a. the series connection of an a-c voltage amplifier responsive to said detected signals at its input, a highpass filter and a rectifier responsive to said a-c voltage output;
   b. a peak value storage device having the output of said rectifier as its input;
   c. a Schmitt trigger, also having as its input the output of said rectifier, the output of said peak value stor- age device being connected as a reference input to the Schmitt trigger; and d. a one shot multivibrator connected to the output of said Schmitt trigger.

2. Apparatus according to claim 1, and further including a differential amplifier coupled between the detector and said a-c voltage amplifier.

3. Apparatus according to claim 2, wherein said high-pass filter has a lower cut off frequency of about 500 Hz.

4. Apparatus according to claim 1, wherein said high-pass filter has a lower cut off frequency of about 500 Hz.

* * * * *